United States Patent [19]

McKinney et al.

[11] 4,416,908

[45] Nov. 22, 1983

[54] INSECT DE-INFESTATION METHOD

[75] Inventors: Howard F. McKinney, Chesterfield; Frederick C. Wear, St. Louis, both of Mo.

[73] Assignee: McDonnell Douglas Corporation, St. Louis, Mo.

[21] Appl. No.: 359,521

[22] Filed: Mar. 18, 1982

Related U.S. Application Data

[63] Continuation-in-part of Ser. No. 167,687, Jul. 11, 1980, abandoned.

[51] Int. Cl.³ .......................... A23L 3/00; H05B 6/64
[52] U.S. Cl. ............................. 426/241; 219/10.55 R; 426/242
[58] Field of Search ...................... 426/241, 242, 237; 34/4, 15, 92; 219/10.55 M, 10.55 R, 10.55 A

[56] References Cited

U.S. PATENT DOCUMENTS 3,611,582 10/1971 Hamid et al. ................ 219/10.55 R
4,015,341 4/1977 McKinney et al. ..................... 34/92

OTHER PUBLICATIONS

Desrosier, "Radiation Effects on Insects", *Radiation Technology in Food, Agriculture and Biology*, 1960, pp. 272-277.

*Primary Examiner*—Robert A. Yoncoskie
*Assistant Examiner*—George C. Yeung
*Attorney, Agent, or Firm*—Gravely, Lieder & Woodruff

[57] ABSTRACT

This application covers a method of treating grain and packaged foodstuffs with microwave energy under vacuum to kill insects, larvae, and eggs without raising the temperature of the product being treated to an extremely high level.

9 Claims, No Drawings

INSECT DE-INFESTATION METHOD

REFERENCE TO PRIOR APPLICATION

This application is related to, contains subject matter in common with, and is a continuation-in-part of Ser. No. 167,687 filed July 11, 1980 entitled INSECT DE-INFESTATION METHOD, now abandoned.

BACKGROUND OF THE INVENTION

Insect infestation of stored grain is an age-old problem. Not only do insects consume the grain but often make what they do not consume unfit for use. The present method destroys the insects and their larvae and their eggs without injury to the grain itself. The literature is replete with equipment for microwave and radio-frequency irradiation of grain and other products for killing insects. However, all the successful methods rely on raising the temperature of the entire grain mass to an elevated temperature and holding it there for a period of time until the insects are killed.

For example, a paper by Nelson, Stetson and Rhine entitled Factors Influencing Effectiveness of Radio-Frequency Electric Fields for Stored-Grain Insect Control published in Transactions of the ASAE, Vol. 9, No. 6, pp. 809-815 (1966) cites a number of references to controlling stored grain insects by RF or high frequency electric fields. Subsequent papers by Nelson include Possibilities for Controlling Stored-Grain Insects with RF Energy, Journal of Microwave Power, 7(3), 1972, Insect-Control Possibilities of Electromagnetic Energy, Cereal Science Today, Vol. 17, No. 12, Dec. 1972, and Possibilities for Controlling Insects with Microwaves and Lower Frequency RF Energy, IEEE Transactions on Microwave Theory and Techniques, Dec. 1974. A series of papers by M. A. K. Hamid, et al, also describe the use of microwave energy for insect control. These include Control of Insects by Microwave Power, Journal of Microwave Power, 3(3), 1968, A New Method for the Control of Moisture and Insect Infestations of Grain by Microwave Power, Journal of Microwave Power, 4(1), 1969, and Comparison of Microwave and Dielectric Heating Systems for the Control of Moisture Content and Insect Infestations of Grain, Journal of Microwave Power, 4(3), 1969.

All of this work, as mentioned, is concerned with raising the temperature of the entire grain mass to a point where the insects are killed. In the present application, we maintain the temperature at a relatively low level, usually not above about 100° F., and combine a vacuum and microwave energy to kill the insects, larvae, and eggs.

In addition to killing insects in stored grain, the present invention also is useful for killing bugs in processed foods. These include crackers, cookies, flour, cake mixes, cereals, and other packaged processed sealed foods. These products are treated after sealing and the resulting shelf life approaches that of canned goods in many instances.

Accordingly, it is a principal object of the present invention to provide a process for killing insects in foodstuffs without raising the temperature of the foodstuff to a damagingly high level.

Another object is to provide a process for killing insect infestations in grain using a combination of vacuum and microwave energy at a relatively low product temperature.

Still another object of this invention is to provide a process, using vacuum and microwave energy to kill insects, larvae, and eggs in sealed packages of foodstuffs.

These and other objects and advantages will become apparent hereinafter.

SUMMARY OF THE INVENTION

The present invention comprises a process for killing insects, larvae, and eggs in foodstuffs by treating the foodstuff in a vacuum with microwave energy and maintaining the temperature of the foodstuff at a relatively low level.

DETAILED DESCRIPTION

The present process can be used for any dry packaged or boxed grain or foodstuff. The apparatus usable with this invention is described in McKinney U.S. Pat. No. 4,015,341 entitled SEED DRYING PROCESS AND APPARATUS issued Apr. 5, 1977. U.S. Pat. No. 4,015,341 describes the drying of seed corn for storage without injuring the germination properties of the corn. As such, it uses a power density of about 1-2 watts/in$^3$ product. These density ranges do not produce the 90-100% insect, egg and larvae kill which is the object and subject matter of this invention.

In the present process the temperature of the product being treated preferably is not allowed to raise above about 100° F. and certainly not above about 120° F. Higher temperatures are still effective in killing insects and larvae, but are wasteful of energy and may tend to injure the foodstuff. This is particularly true if the product being treated is a grain seed. The sprouting properties may be affected by higher temperatures.

The vacuum in the apparatus containing the product to be treated is about 5 to about 85 Torr, preferably about 35 Torr. The lower the pressure, i.e., the greater the vacuum, the better is the kill and the lower the temperature which can be maintained in the product.

The watt density preferably should be above about 4 watts/in$^3$ of product. The preferred watt density is about 6 to about 10 watts/in$^3$. The exposure duration is more than about 0.75 watt hour/in$^3$ of product.

When a watt density of about 4 watts/in$^3$ of product is used there is greater than 90% kill of insects, eggs and larvae while the temperature of the product is maintained below about 120° F. to minimize product damage. The pressure is reduced to below about 85 Torr to facilitate the low temperature kill. When the power density is as great as about 6 watts/in$^3$ of product, 100% kill of insects, eggs and larvae is achieved, again at low (less than about 120° F.) product temperature.

The microwave frequency can be between about $10^2$ MH$_z$ and $10^4$ MH$_z$. As a practical matter, the only two frequencies which will be used are 915 MH$_z$ and 2450 MH$_z$, since these are the only two frequencies which the Federal Communications Commission has allocated for commercial microwave heating applications. The lower frequency is believed to enhance the insect, egg and larvae kill.

The following examples illustrate the high kill of insects, larvae and eggs at temperatures below about 120° F.

EXAMPLE NO. 1

This example shows the effect of various microwave grain drying cycles on various grain and insect combinations. In this example, 120 cages (each 7/16 inch in diameter by 12 inches in length) were equally distributed into five color groups of 24 cages each. The cages contained various combinations of insects and grains. Following Table 1 shows how the 24 cages in a typical color group (pink) were distributed with respect to the combinations of grains and insects, the three different sets of treatment conditions, and one control specimen.

TABLE 1
TYPICAL INSECT-GRAIN COMBINATION AND EXPOSURE PROCEDURE

| Cage Colors | Cage Quantity |
|---|---|
| Blue | 24 |
| Red | 24 |
| Yellow | 24 |
| Green | 24 |
| Pink | 24 |

Cage Contents For Each Color Quantity

| Cage Quantity | Grain | Insects |
|---|---|---|
| 4 | Rye | Angoumois Grain Moth |
| 4 | Corn | Angoumois Grain Moth |
| 4 | Wheat | Angoumois Grain Moth |
| 4 | Corn | Lesser Grain Borer and Maize Weevil |
| 4 | Rye | Lesser Grain Borer and Maize Weevil |
| 4 | Wheat | Lesser Grain Borer and Maize Weevil |

Four Exposure Conditions

| Cage Color | Quantity | Power Density Watts/In$^3$ | Exposure Time Min. | Pressure Torr |
|---|---|---|---|---|
| Pink | 6 | 4.63 | 10 | 35 |
| Pink | 6 | 1.39 | 30 | 35 |
| Pink | 6 | 0.46 | 90 | 35 |
| Pink | 6 | 0.0 (Control) | 0 | 760 |

Each of the four remaining cage colors were distributed and exposed in the same manner as the pink, so that there were five replications of each power density-exposure time—pressure combinations. This is illustrated in Table 2 which follows.

TABLE 2
TEST EXPOSURE MATRIX

| | Test No. | Power Density | Exposure Time Min. | Pressure Torr | Cage Color | No. of Cages |
|---|---|---|---|---|---|---|
| | 1 | 4.63 watts/in$^3$ | 10 | 35 | Pink | 6 |
| | 2 | 4.63 watts/in$^3$ | 10 | 35 | Green | 6 |
| | 3 | 4.63 watts/in$^3$ | 10 | 35 | Yellow | 6 |
| | 4 | 4.63 watts/in$^3$ | 10 | 35 | Red | 6 |
| | 5 | 4.63 watts/in$^3$ | 10 | 35 | Blue | 6 |
| | 6 | *2.78 watts/in$^3$ | 30 | 35 | Pink | 6 |
| | 7 | 1.39 watts/in$^3$ | 30 | 35 | Green | 6 |
| | 8 | 1.39 watts/in$^3$ | 30 | 35 | Yellow | 6 |
| | 9 | 1.39 watts/in$^3$ | 30 | 35 | Red | 6 |
| | 10 | 1.39 watts/in$^3$ | 30 | 35 | Blue | 6 |
| | 11 | 0.46 watts/in$^3$ | 90 | 35 | Pink | 6 |
| | 12 | 0.46 watts/in$^3$ | 90 | 35 | Green | 6 |
| | 13 | 0.46 watts/in$^3$ | 90 | 35 | Yellow | 6 |
| | 14 | 0.46 watts/in$^3$ | 90 | 35 | Red | 6 |
| | 15 | 0.46 watts/in$^3$ | 90 | 35 | Blue | 6 |
| | 16 | 0 watts/in$^3$ | 0 | 760 | Pink | 6 |
| Controls | 17 | 0 watts/in$^3$ | 0 | 760 | Green | 6 |
| | 18 | 0 watts/in$^3$ | 0 | 760 | Yellow | 6 |
| | 19 | 0 watts/in$^3$ | 0 | 760 | Red | 6 |
| | 20 | 0 watts/in$^3$ | 0 | 760 | Blue | 6 |

*Power setting was twice the desired value by mistake.

The moisture content of the grain in the foregoing tests of Tables 1 and 2 was measured and found to be as follows:

| Rye | 12.5% wet basis |
|---|---|
| Wheat | 12.4% wet basis |
| Corn | 12.1% wet basis |

In order to contain the heat within the cage during microwave exposure to optimize the possibility of insect kill, the six cages required for each test were sandwiched between two blankets of vermiculite. The vermiculite, which was maintained at a 43% W.B. moisture content, also served as a power absorber so that arcing would not occur. The six cage-vermiculite assembly was placed on the rotatable table in the microwave chamber for the exposure conditions. Cage temperatures were not monitored insitu, but were found to be less than 100° F. immediately following removal from the chamber.

INSECT DATA

After all the tests were completed, a six week incubation and observation program was initiated. The effectiveness of each power density level with respect to insect kill was judged by counting the number of living insects at the conclusion of the six week period and comparing the number to the number existing in the control. The results of insect incubation tests following their microwave exposure is shown in Table 3 which follows.

TABLE 3
INSECT EMERGENCE RESULTS

| Grain-Insect Combination | | Insects Emerged as % of Control For Indicated Power Densities | | | |
|---|---|---|---|---|---|
| | | Control | 0.46 watts/in$^3$ | 1.39 watts/in$^3$ | 4.63 watts/in$^3$ |
| Rye | Angoumois Grain Moth | 100% | 78.6% | 16.0% | 0% |
| Corn | Angoumois Grain Moth | | 70.3 | 24.8 | 0 |
| Wheat | Angoumois Grain Moth | | 86.4 | 44.8 | 1.7 |
| Corn | Lesser Grain Borer | | 48.4 | 22.6 | 0 |
| Corn | Maize Weevil | | 66.4 | 20.9 | 0 |
| Rye | Lesser Grain Borer | | 82.6 | 33.5 | 0.8 |
| Rye | Rice Weevil | | 74.0 | 30.9 | 0 |
| | Lesser Grain Borer | | 100.4 | 58.2 | 3.8 |

TABLE 3-continued

| | INSECT EMERGENCE RESULTS | | | |
|---|---|---|---|---|
| | | Insects Emerged as % of Control For Indicated Power Densities | | |
| Grain-Insect Combination | Control | 0.46 watts/in$^3$ | 1.39 watts/in$^3$ | 4.63 watts/in$^3$ |
| Wheat Rice Weevil | | 60.2 | 24.3 | 1.0 |

The data summarized in Table 3 indicates that the higher power densities coupled with low pressure produces a lethal environment.

EXAMPLE NO. 2

This example was conducted in two parts. In the first part, the effects of microwave exposure times on stored-product insects was investigated. The second part evaluated microwave intensities, with and without low pressures, that were required to control two species of stored-product insects infesting stored grain.

In the first part, the four species of stored-product insects used were selected because of their wide range of susceptibility to elevated temperatures. All are found commonly infesting grain in storage. These species were lesser grain borer, *Rhyzopertha dominica* (F.), rice weevil, *Sitophilus oryzae* (L.), maize weevil, *Sitophilus zeamais* Motschulsky, and the Angoumois grain moth, *Sitotroga cerealella* (Olivier). Cultures of all tested species were obtained from an insect-rearing section of a Department of Agriculture laboratory where they have been maintained for many years. These cultures were used for infestation of the corn, wheat, and rye used in this part. Newly emerged adults were added to the grains at weeky intervals to ensure that all stages of the infesting insects would be present in the grain at treatment time.

Each kind of grain was infested separately with one species of insect. Before treatment, certain combinations of the infested stocks of grains were made to facilitate treatment of the grain and counting of the emerging adults. Since the immature beetle infestations are within the kernels of grain, there would be no competition between the species. The rye infested with the lesser grain borer was combined with the rye infested with the rice weevil. The same was done with the wheat infested with these two species. The lots of corn infested with the maize weevil and the lesser grain borer were combined but the grains infested with the Angoumois grain moth were kept separate.

The Angoumois grain moth infested rye, corn, and wheat averaged 14.3, 13.7, and 14.4% moisture, respectively, prior to treatment. The beetle infested rye, corn, and wheat averaged 14.5, 14.0 and 14.8% moisture, respectively, prior to treatment. For treatment, 15-g samples of each infested grain were placed in cages made of 1.27-cm I.D. polyethylene tubing that had been perforated along the sides. The ends of the tubing were closed with wooden plugs. After the cages were filled, they were treated in a 91.4 cm diameter dryer made according to U.S. Pat. No. 4,015,341, which used microwaves at 2450 MH$_z$ and was equipped with a turntable that rotated at about 6.5 RPM to provide a uniform treatment.

The infested grains were treated at three rates. The high rate of treatment was 4.63 watts/in$^3$ of grain for 10 min at 35 Torr. The intermediate rate was 1.39 watts/in$^3$ of grain for 30 min at 35 Torr. The low level of treatment was 0.46 watts/in$^3$ of grain for 90 min at 35 Torr. The controls received no microwave treatment and remained at atmospheric pressure. The treatments and controls were replicated five times, with the exception of the intermediate level of treatment. Only four replicates were used due to an error made in treatment rate on one of the replicates. The mean numbers of emerging adults for each insect species, grain, and treatment were analyzed by Duncan's multiple range part at the 0.05 level of significance.

In the second part, wheat and rye were infested with both the rice weevil, Sitophilus oryzae and the lesser grain borer, Rhyzopertha dominica. Newly emerged adults of both species were added to the grain at weekly intervals to ensure that all life stages of both species would be present in the grains at the time of treatment.

The infested rye had an average moisture content of 14.3% and the wheat had an average moisture content of 14.7%. The infested grains received five different treatments. These were vacuum only 35 Torr, microwave only at 6.2 watts/in$^3$ of product, microwave only 5.88 watts/in$^3$ of product, microwave plus vacuum at 6.2 watts/in$^3$ plus 35 Torr, and microwave plus vacuum at 5.88 watts/in$^3$ plus 35 Torr.

An additional sample of each infested grain was included in each treatment for grain temperature measurements. These temperatures were taken immediately after the treated cages of grain were removed from the treatment chamber. One cage was opened immediately after treatment and the grain temperature determined by means of a copper-constantan thermocouple inserted in the grain mass.

RESULTS

The mean numbers of adult insects that emerged from each of the grains in the first part are given in Table No. 4. Generally, the low rate of treatment 0.46 watts/in$^3$ of grain for 90 min at 35 Torr was ineffective. It produced only small reductions in the numbers of emerging adult insects.

The intermediate treatment rate produced significant reductions in the numbers of emerging adults for nearly all combinations of insect species and grains tested. The high rate of treatment 4.63 watts/in$^3$ of grain for 10 min at 35 Torr was the most effective. It produced complete control of the Angoumois grain moth infesting rye and corn, of the lesser grain borers and maize weevils in corn, and the rice weevils infesting rye. In fact, the highest rate of treatment produced in excess of 95% control of all insect species treated.

In the second part, generally, there were no significant differences shown in the emergence of the lesser grain borer or rice weevil adults from wheat or rye when vacuum alone was compared with the untreated controls (Table No. 5). All of the treatments, in which microwaves were used produced significantly fewer emerging adults than did the atmospheric or vacuum controls. When the high dosage of microwaves 6.6 watts/in$^3$ of grain was combined with low pressure 35

Torr complete control of the infestations was achieved.

TABLE 4

MEAN NUMBERS OF ADULTS EMERGING FROM FIVE REPLICATES[1] OF RYE, CORN, OR WHEAT TREATED WITH MICROWAVES AND VACUUM

| Insect | Power Density Watts/in$^3$ Of Grain | Time (Min) | Pressure (torr) | Grain[2] Rye | Corn | Wheat |
|---|---|---|---|---|---|---|
| Angoumois | 0.00 | 0 | 760 | 15.00a | 20.20a | 193.00a |
| Grain | .46 | 90 | 35 | 11.80a | 14.20b | 166.80a |
| Moth | 1.39 | 30 | 35 | 3.00b | 6.25c | 108.00b |
|  | 4.63 | 10 | 35 | 0.00c | 0.00d | 3.20c |
| Lesser | .00 | 0 | 760 | 79.40a | 6.20a | 95.60a |
| grain borer | .46 | 90 | 35 | 65.60a | 3.00a | 96.00a |
|  | 1.39 | 30 | 35 | 33.25b | 1.75a | 68.50b |
|  | 4.63 | 10 | 35 | 0.60c | 0.00b | 4.40c |
| Rice | .00 | 0 | 760 | 91.40a |  | 60.80a |
| weevil | .46 | 90 | 35 | 67.60b |  | 36.60b |
|  | 1.39 | 30 | 35 | 35.25c |  | 18.50c |
|  | 4.63 | 10 | 35 | 0.00d |  | 0.80d |
| Maize | .00 | 0 | 760 |  | 26.80a |  |
| weevil | .46 | 90 | 35 |  | 17.80b |  |
|  | 1.39 | 30 | 35 |  | 7.00c |  |
|  | 4.63 | 10 | 35 |  | 0.00d |  |

[1] Only 4 replicates were used in the 1.39 watts/in$^3$ treatment.
[2] Means Numbers followed by the same letter are not significantly different according to Duncan's multiple range part at the 0.05 level of significance.

TABLE 5

MEANS NUMBERS OF ADULT RICE WEEVILS (RW) AND LESSER GRAIN BORERS (LGB) EMERGING FROM FIVE REPLICATES OF INFESTED WHEAT AND RYE TREATED WITH DIFFERENT COMBINATIONS AND LEVELS OF MICROWAVES AND LOW PRESSURE

| Treatment | Power Density Watts/in$^3$ of Grain | Pressure (Torr) | Post-treatment temp (°F.) | Emergence[1] Wheat RW | LGB | Rye RW | LGB |
|---|---|---|---|---|---|---|---|
| ATMOS - CK | 0.00 | 760 | 78° F. | 6.4a | 13.4a | 46.8a | 168.6a |
| Vacuum - CK | 0.00 | 35 | 80° F. | 5.8a | 4.6b | 51.4a | 178.8a |
| Low - ATMOS | 5.66 | 760 | 132° F. | 2.6b | 1.4c | 0.4b | 6.0c |
| High - ATMOS | 6.2 | 760 | 140° F. | 0.8c | 0.6d | 1.2b | 8.4c |
| Low - VAC | 5.66 | 35 | 110° F. | 0.2c | 2.2c | 2.6b | 76.6b |
| High - VAC | 6.2 | 35 | 106° F. | 0.0d | 0.0e | 0.0c | 0.0d |

[1] Mean numbers in each column followed by a different letter are significantly different as determined by Duncan's Multiple Range Part at the 0.05 level of significance

What is claimed is:

1. A method of treating products such as grain and packaged foodstuffs containing insects, larvae, and eggs to kill said insects, larvae, and eggs in the products by microwave energy comprising the steps of:
   (a) placing the product in an atmosphere of reduced pressure of about 5 to about 85 Torr, and
   (b) subjecting the product to microwave energy of about $10^2$ MH$_z$ to about $10^4$ MH$_z$ frequency and a power density of at least about 4 watts/in$^3$ of product being treated for a time sufficient to kill any insects and larvae in the product without raising the temperature of the product substantially above 120° F. and without substantially injuring the grain or foodstuff.

2. The process of claim 1 wherein the exposure duration of the product is at least about 0.5 watt hours/in$^3$ of product treated.

3. The process of claim 1 wherein the power density is about 6 to about 10 watts/in$^3$ of product being treated.

4. A method of treating products such as grain and packaged foodstuffs containing insects and larvae to kill said insects and larvae in the products by microwave energy including:
   (a) placing the product in a chamber having a pressure of about 5 to about 85 Torr,
   (b) exposing the product to microwave energy of about $10^2$ MH$_z$ to about $10^4$ MH$_z$ frequency and a power density of about 4 to about 8 watts/in$^3$ of product being treated for an exposure duration of about 0.5 to about 1.4 watt hours/in$^3$ of product,
   (c) maintaining the temperature of the product below 120° F. during treatment with the microwave energy, and
   (d) recovering a product substantially free of viable insects, larvae and eggs.

5. A method of treating products such as grain and packaged foodstuffs containing insects, larvae, and eggs to kill said insects, larvae, and eggs in the products by microwave energy comprising the steps of:
   (a) placing the product in an atmosphere of reduced pressure, and
   (b) subjecting the product to microwave energy of about $10^2$ MH$_z$ to about $10^4$ MH$_z$ frequency and a power density of at least about 4 watts/in$^3$ of product being treated for an exposure duration of at least about 0.5 watt hours/in$^3$ of product treated, while the temperature of the product is not raised substantially above 120° F.

6. The process of claim 5 wherein the power density is about 6 to about 10 watts/in$^3$ of product being treated.

7. The process of claim 5 wherein the pressure in the reduced atmosphere is about 5 to about 85 Torr.

8. The process of claim 5 wherein the temperature of the product is not raised substantially above 100° F.

9. The process of claim 8 wherein the pressure in the reduced atmosphere is between about 5 to about 85 Torr.

* * * * *